US012647851B2

(12) United States Patent
Polaganga

(10) Patent No.: US 12,647,851 B2
(45) Date of Patent: Jun. 2, 2026

(54) UPLINK NEW RADIO CARRIER AGGREGATION AWARE PRIMARY AND SECONDARY CELL SELECTION

(71) Applicant: T-MOBILE INNOVATIONS LLC, Overland Park, KS (US)

(72) Inventor: Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 683 days.

(21) Appl. No.: 18/101,303

(22) Filed: Jan. 25, 2023

(65) Prior Publication Data

US 2024/0251306 A1 Jul. 25, 2024

(51) Int. Cl.
*H04W 36/30* (2009.01)
*H04W 36/00* (2009.01)
*H04W 36/08* (2009.01)

(52) U.S. Cl.
CPC ..... *H04W 36/00692* (2023.05); *H04W 36/08* (2013.01); *H04W 36/30* (2013.01)

(58) Field of Classification Search
CPC ........... H04W 36/00692; H04W 36/08; H04W 36/30

USPC .................................. 370/331; 455/312, 436
See application file for complete search history.

(56) References Cited

U.S. PATENT DOCUMENTS

2022/0322331 A1* 10/2022 Takeda .................. H04W 72/21
2024/0107414 A1* 3/2024 Huang .................. H04W 76/19

* cited by examiner

*Primary Examiner* — Marcos Batista
(74) *Attorney, Agent, or Firm* — SHOOK, HARDY & BACON L.L.P.

(57) ABSTRACT

Dynamic carrier aggregation cell relationship management systems and methods are provided. The method begins when a base station receives at least one first uplink message from a UE that includes at least one UL and DL carrier aggregation frequency set that the UE supports. The base station then determines if the current serving primary cell frequency used by the UE is included in the base station's set of UL NRCA frequency combinations. If the current serving primary cell frequency used by the UE is not included in the set of UL NRCA frequency combinations the base station compares the bandwidth of the current serving primary cell with a bandwidth of the candidate primary cell. If the different in bandwidth is less than a predetermined operator defined threshold, the UE is instructed to handover from the current serving primary cell to the candidate primary cell.

17 Claims, 8 Drawing Sheets

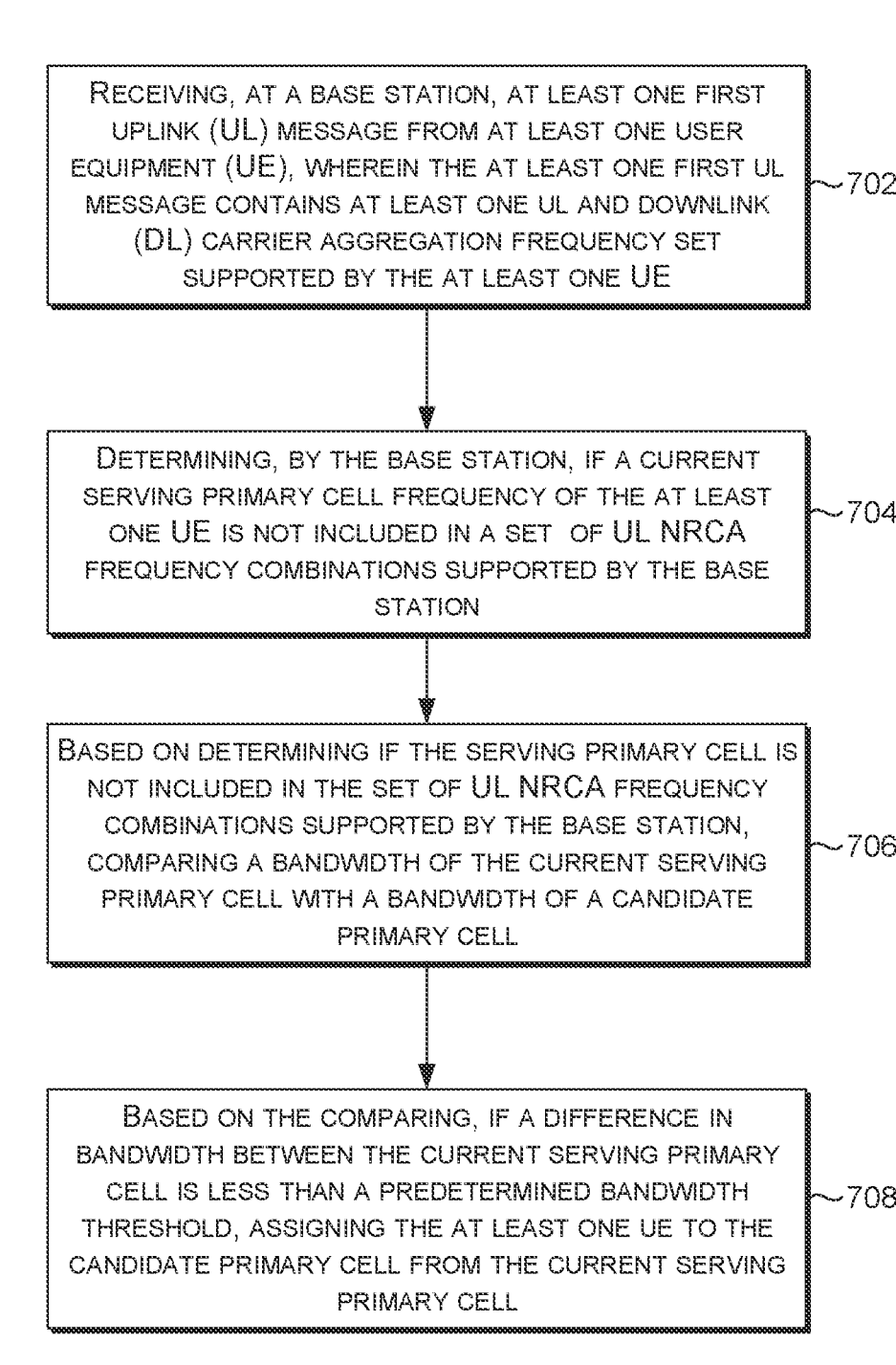

700

RECEIVING, AT A BASE STATION, AT LEAST ONE FIRST UPLINK (UL) MESSAGE FROM AT LEAST ONE USER EQUIPMENT (UE), WHEREIN THE AT LEAST ONE FIRST UL MESSAGE CONTAINS AT LEAST ONE UL AND DOWNLINK (DL) CARRIER AGGREGATION FREQUENCY SET SUPPORTED BY THE AT LEAST ONE UE ~702

DETERMINING, BY THE BASE STATION, IF A CURRENT SERVING PRIMARY CELL FREQUENCY OF THE AT LEAST ONE UE IS NOT INCLUDED IN A SET OF UL NRCA FREQUENCY COMBINATIONS SUPPORTED BY THE BASE STATION ~704

BASED ON DETERMINING IF THE SERVING PRIMARY CELL IS NOT INCLUDED IN THE SET OF UL NRCA FREQUENCY COMBINATIONS SUPPORTED BY THE BASE STATION, COMPARING A BANDWIDTH OF THE CURRENT SERVING PRIMARY CELL WITH A BANDWIDTH OF A CANDIDATE PRIMARY CELL ~706

BASED ON THE COMPARING, IF A DIFFERENCE IN BANDWIDTH BETWEEN THE CURRENT SERVING PRIMARY CELL IS LESS THAN A PREDETERMINED BANDWIDTH THRESHOLD, ASSIGNING THE AT LEAST ONE UE TO THE CANDIDATE PRIMARY CELL FROM THE CURRENT SERVING PRIMARY CELL ~708

FIG. 7

UPLINK NEW RADIO CARRIER AGGREGATION AWARE PRIMARY AND SECONDARY CELL SELECTION

BACKGROUND

Wireless telecommunications networks, such as 5G and LTE networks are standardized to facilitate aggregation of multiple carrier combinations in order to provide higher data speeds and throughput to the user equipment (UE) of end users. Ideally, serving carriers used for carrier aggregation at a cellular site cover overlapping geographical areas with multiple frequency combinations so that carrier aggregation capable UE in such locations can activate use of multiple serving carriers and take advantage of the resulting enhanced data throughput. Currently downlink new radio carrier aggregation (DL NRCA) is being used by operators to provide high downlink speeds to 5G users. As NRCA evolves uplink (UL) NRCA is being introduced to provide high uplink speeds. UL NRCA needs more combinations of frequencies to accommodate more operators and their spectrum holdings. UL NRCA combinations are not currently supported by devices and selecting primary and secondary cells for user equipment (UE) to use among available candidate layers poses a problem.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In some embodiments, solutions are provided that address the problem of providing UL NRCA aware primary and secondary cell selection. A first aspect provides a method for UL NRCA aware primary and secondary cell selection. The method begins when a base station receives at least one first uplink message from a UE. This first uplink message may be requesting a handover from another cell site or may reflect a new connection. The UE may include in the first uplink message at least one UL and DL carrier aggregation frequency set that the UE supports. Upon receipt of the first UL message, the base station determines if a frequency associated with a current serving primary cell of the at least one UE is included in the base station's set of UL NRCA frequency combinations. If the frequency associated with the current serving primary cell is not included in the set of UL NRCA frequency combinations supported by the base station, then the bandwidth of the current serving primary cell is compared with a bandwidth of a candidate primary cell. If the difference in bandwidth between the current serving primary cell is less than a predetermined bandwidth threshold, then the at least one UE is assigned to the candidate primary cell from the current serving primary cell. is less than a predetermined operator defined threshold, the UE is instructed to handover from the current serving primary cell to the candidate primary cell.

DL secondary cells may also be determined. The UL NRCA and initial DL NRCA frequency combinations are determined. Next, the UL NRCA frequency combination used by the UE is evaluated to determine if the UL NRCA frequency combination is a subset of the already configured DL NRCA frequency combinations. The effective bandwidth of DL NRCA frequency combinations that are a subset of configured DL NRCA frequency combinations is then compared and, if the effective bandwidth difference is less than a predetermined operator configured threshold, the secondary cell may be used by the UE.

BRIEF DESCRIPTION OF THE DRAWINGS

Aspects of the present disclosure are described in detail herein with reference to the attached Figures, which are intended to be exemplary and non-limiting, wherein:

FIG. 7 is flow chart illustrating a method for dynamically managing carrier aggregation configuration according to an embodiment;

DETAILED DESCRIPTION

Figure 1A:
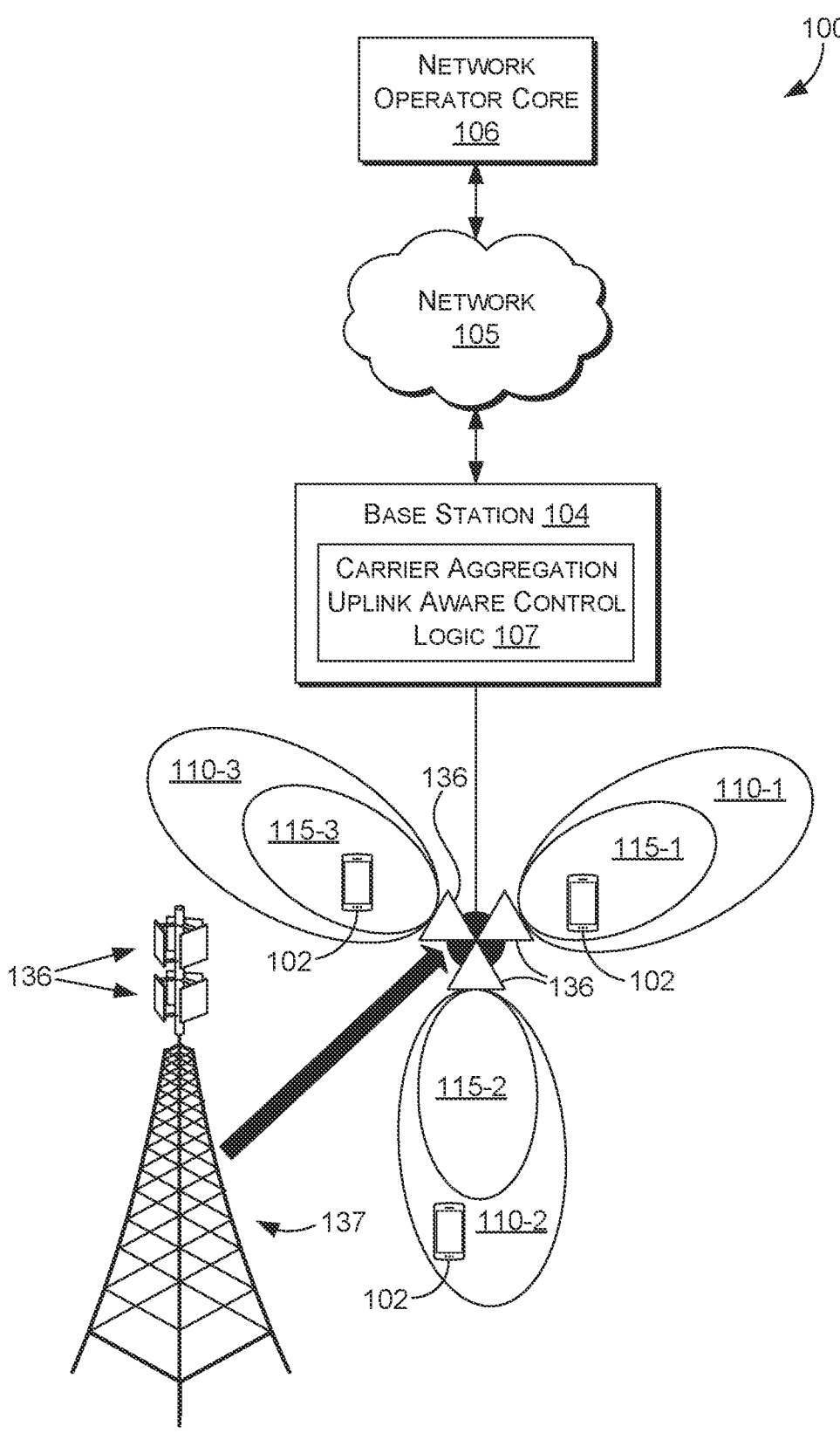
FIGS. 1A and 1B are diagrams illustrating an example network environment, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Carrier Aggregation (CA) is a provision of 5G and LTE standards that enables wireless operators to combine distinct carrier channels from a primary serving cell (P-cell) and at least one secondary serving cell (S-cell) into a single data channel to obtain higher data rates with mobile user equipment (UE). In general, for a UE to benefit from carrier aggregation, the UE is located within an overlapped area of cell boundaries that includes coverage from a primary serving cell operating via a primary component carrier (e.g. at carrier frequency, $f_1$), and a secondary serving cell operating via a second component carrier (e.g. at carrier frequency, $f_2$). The primary component carrier and second component carrier can either be within the same frequency band (e.g., both carriers in band N41) or within different frequency bands (e.g., one carrier in band N41 and the other in band N71). It should also be understood that primary component carrier and second component carrier can both implement the same duplexing scheme (e.g., both frequency division duplexing (FDD) and time division duplexing (TDD)), or different duplexing schemes (e.g., a combination of FDD and TDD).

The use of carrier aggregation improves data rates for UE by increasing the overall bandwidth of the logical channel available to the UE to send and/or receive data to the network operator core. At present, DL NRCA is being used to provide high DL speeds to 5G users. With technology evolution, UL NRCA is being introduced to provide high uplink speeds. Initially, only certain UL NRCA frequency combinations will be supported, however, subsequent chipsets and devices will support more frequency combinations to accommodate more operators and their spectrum holdings. The UL NRCA frequency combinations are preferably a subset of the DL NRCA frequency combinations to be supported by the device for standardization and implementation feasibility. Careful consideration of frequency combinations is needed to ensure primary and secondary cells are available for UEs among the available candidate layers.

One or more of the aspects of the present disclosure provide for, among other things, solutions that address the problem of providing UL NRCA aware primary and second cell selection. The method begins with receiving, at a base station, at least one first uplink message from at least one UE. The first uplink message contains at least one UL and DL carrier aggregation frequency set supported by the at least one UE. The base station then determines, if a frequency associated with a current serving primary cell of the at least one UE is included in a set of UL NRCA frequency combinations supported by the base station. If the frequency associated with the current serving primary cell is not included in the set of UL NRCA frequency combinations supported by the base station, then the method continues with comparing a bandwidth of the current serving primary with a bandwidth of the current serving primary cell. If a difference in bandwidth between the current serving primary cell is less than a predetermined bandwidth threshold, then the at least one UE is assigned to the candidate primary cell from the current serving primary cell.

An additional aspect of the present disclosure provides a method of NRCA aware primary and secondary cell selection. A UE transmits at least one first UL message containing at least one UL frequency combination and at least one DL frequency combination supported by the UE to a base station. The UE then receives from the base station a handover instruction to move from a current serving primary cell to a new primary cell. The handover instruction is issued by the base station only if certain conditions for carrier aggregation frequency sets and bandwidth availability are met.

A still further aspect of the present disclosure provides a non-transitory computer storage media storing computer-useable instructions that, when used by one or more processors, cause the processors to receive, at a base station, at least one first UL message from at least one UE that contains at least one UL and one DL NRCA frequency set supported by the UE. The instructions then determine, at the base station, if a current serving primary cell frequency of the UE is included in a set of UL NRCA frequency combinations supported by the base station. If the serving primary cell frequency of the UE is not included in the frequency combinations supported by the base station, the instructions then compare a bandwidth of the current serving primary cell with a bandwidth of a candidate primary cell. Based on the bandwidth comparison, if the difference in bandwidth between the current primary cell is less than a predetermined bandwidth threshold, the UE is instructed to change from the current serving primary cell to the candidate primary cell.

Figure 1B:
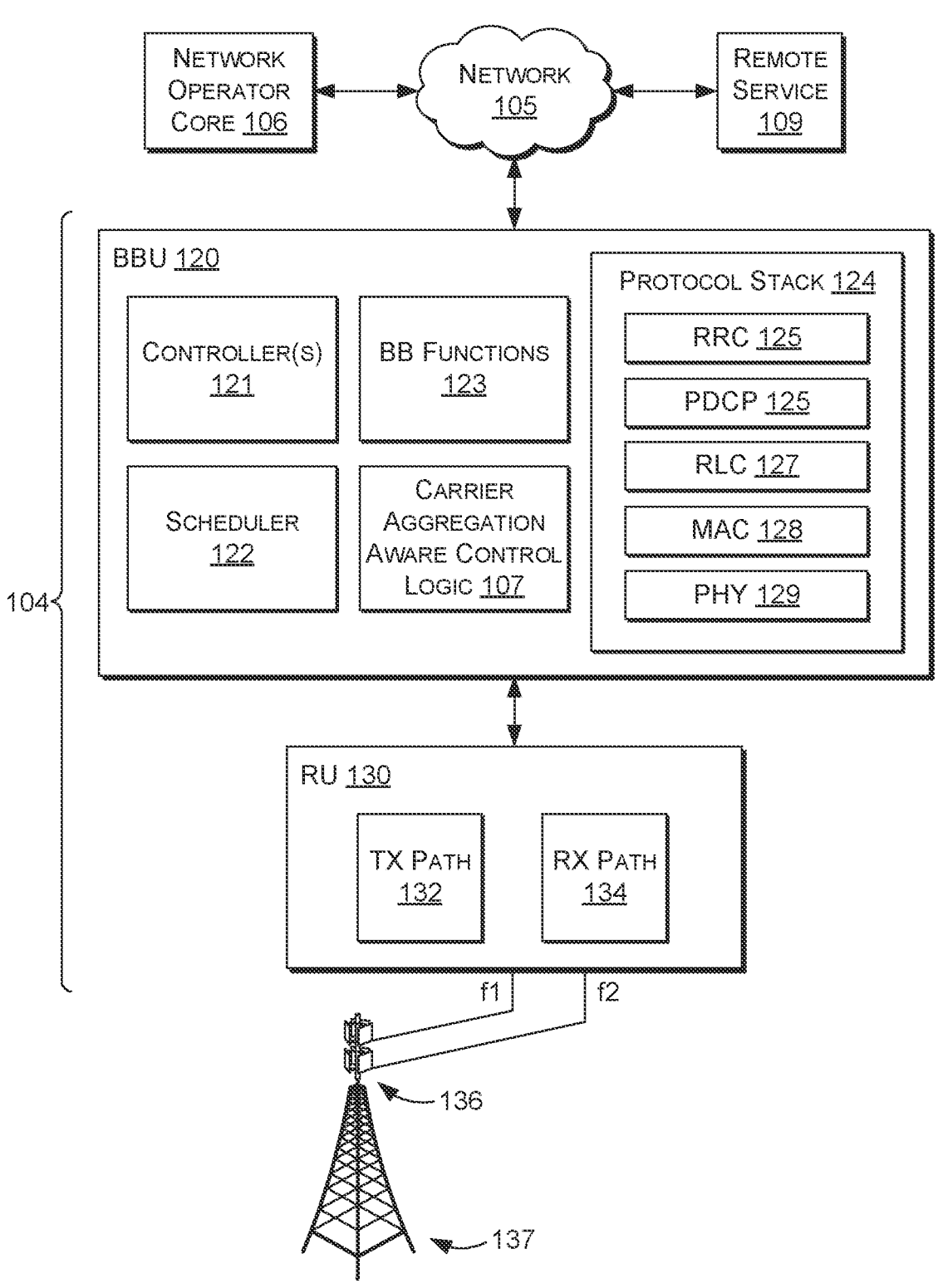

FIG. 1 is a diagram illustrating an example network environment 100 embodiment in which aspects of dynamic carrier aggregation configuration management, including carrier aggregation UL aware control logic may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises a network operator core 106 that provides one or more wireless network services to one or more UEs 102 via a base station 104, often referred to as a radio access network (RAN). In the context of fourth generation (4G) Longer Term Evolution (LTE), the base station 104 may be referred to as an eNodeB, or eNB. In the context of fifth generation (5G) New Radio (NR), the base station 104 may be referred to as a gNodeB, or gNB. Other terminology may also be used depending on the specific implementation technology. In particular, each UE 102 communicates with the network operator core 106 via the base station 104 over one or both of uplink (UL) radio frequency (RF) signals and downlink (DL) RF signals. The base station 104 may be coupled to the network operator core 106 by a backhaul network 105 that comprises wired and/or wireless network connections that may include wireless relays and/or repeaters. In some embodiments, the base station 104 is coupled to the network operator core 106 at least in part by the Internet or other public network infrastructure. The network environment 100 is configured for wirelessly connecting UEs 102 to other UEs 102 via the same base station 104, via other base stations, or via other telecommunication networks such as backhaul network 105 or a publicly-switched telecommunication network (PSTN), for example. Generally, each UE 102 is a device capable of unidirectional or bidirectional communication with radio units (also often referred to as radio points or wireless access points) of the base station 104 using RF waves.

As illustrated in FIG. 1, the base station 104 radiates and receives RF signals via one or more directional antennas 136 that each serve UE 102 that are located within a geographic area referred to as a cell or sector. The specific size, shape and orientation of a cell is a function, at least in part, on the design and azimuth (tilt) of each of the several antenna 136, and the carrier frequency of the carrier serving that cell. In the particular embodiment illustrated in FIG. 1, base station 104 forms six cells (or sectors) each via a respective antenna 136 mounted to a site tower 137. In other embodiments, a few or greater number of cells may be formed.

Cells 110-1, 110-2 and 110-3 operate at a first carrier frequency, $f_1$, and cells 115-1, 115-2 and 115-3 operate at a second carrier frequency, $f_2$. In some embodiments, carrier frequency, $f_1$, is a low-band frequency and carrier frequency, $f_2$, is a high- or mid-band frequency so that cells 115-1, 115-2 and 115-3 each cover relatively smaller geographic areas than cells 110-1, 110-2 and 110-3. In this example, when a UE 102 initializes communications with the base station 104, it is allocated one or more resource blocks available on carrier frequency, $f_1$, so that carrier frequency, $f_1$, is the primary component carrier for that UE 102. Depending on its physical location, one of the cells 110-1, 110-2 and 110-3 therefore serves as the primary serving cell for that UE 102. The cells 115-1, 115-2 and 115-3 operating with the carrier frequency, $f_2$, are each potential secondary serving cells for the secondary component carrier that may be used in combination with cells 110-1, 110-2 and 110-3 to implement carrier aggregation for UE 102.

As previously explained, secondary cell activation for a UE 102 is available when the UE 102 is located within an overlapping region of a primary serving cell and a secondary serving cell, and those primary and secondary serving cells are specifically related to each other by the base station 104 for purposes of carrier aggregation in UL or DL.

Referring now to FIG. 1A, FIG. 1A illustrates a base station 104 comprising a baseband unit (BBU) 120 coupled to a least one Radio Unit (RU) 130 through which the base station 104 serves a coverage area that comprises the cells 110-1, 110-2 and 110-3 and cells 115-1, 115-2 and 115-3 (shown in FIG. 1). The BBU 120 comprises the circuitry and functionality to implement an air interface and Open System Interconnection (OSI) Layer 1, Layer 2 and Layer 3 functions for the air interface. The RU 130 includes a radio head comprising transmit (TX) path 132 that includes radio transmitter circuitry (such digital-to-analog converters, one or more RF filters, frequency up-converters, and/or a Power Amplifier (PA)) and receive path (RX) 134 that includes radio receiver circuitry (such analog-to-digital converters, one or more RF filters, frequency down converters, and/or a Low Noise Amplifier (LNA).) The TX path 132 and RX path 134 may be coupled to the plurality of antenna 136 by an appropriate coupler (such as a duplexer, for example). The antennas 136 may be physically mounted to a site tower 137 or other structure (such as a building, for example). Downlink RF signals are radiated into the coverage area via TX path 132 and antenna 136 for reception by the UEs 102. Uplink RF signals transmitted by the UEs 102 are received via the antenna 136 and RX path 134. The base station 104 may communicate with the UE 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the base station 104 may optionally support multiple air interfaces and/or multiple wireless operators.

The network environment 100 and base station 104 are generally configured for wirelessly connecting UE 102 to data or services that may be accessible on one or more application servers or other functions, nodes, or servers (such as a remote service 109, for example). In some implementations, the remote service 109 serves as the originating server or servers for operating data (such as environmental data, traffic condition data, navigation and/or other operating commands) delivered to the UE 102 and/or utilized for operation of the UE 102.

It should be understood that in some aspects, the network environment 100 shown in FIGS. 1 and 1A may implement one or more features of the network operator core 106 within other portions of the network, or may not implement them at all, depending on various carrier preferences.

As depicted in FIG. 1A, the BBU 120 may comprise one or more controllers 121 comprising a processor coupled to a memory and programed to perform one or more of the functions of the BBU 120 described herein. In some embodiments, the base station functions described herein may be executed by one or more controllers in a distributed manner utilizing one or more network functions orchestrated or otherwise configured to execute utilizing processors and memory of the one or more controllers. For example, where base station 104 comprises a gNodeB, the functions of the BBU 120 may be distributed between functional units comprising a Centralized Unit (CU) and at least one Distributed Unit (DU). As such, one or more functions of the base station described herein may be implemented by discrete physical devices or via virtual network functions.

The BBU 120 is responsible for, among other things, digital baseband signal processing, for example to process uplink and downlink baseband signals, shown in FIG. 1A as Baseband (BB) function(s) 123. The BBU 120 further includes a scheduler 122 through which the BBU 120 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 122 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink and downlink communications traffic between the BBU 120 and UE 102 are processed through a protocol stack 124 implemented by the BBU 120 that comprises various protocol stack layers. In the example embodiment illustrated in FIG. 1A, the protocol stack 124 includes a radio resource control (RRC) layer 125, packet data convergence protocol (PDCP) layer 126, radio link control (RLC) layer 127, medium access control (MAC) layer 128, and physical layer (PHY) 129. In some embodiments, the implementation of carrier aggregation is performed at least in part by the RRC layer 125 and MAC layer 128.

The MAC layer 128 is responsible, for example, for mapping between logical channels of the RLC layer 127 and transport channels of the PHY layer 129. MAC layer 128 may also perform functions such as, but not limited to, multiplexing of MAC service data units (SDUs) from logical channels onto transport blocks (TB) to be delivered to the PHY layer 129 on transport channels, de-multiplexing of MAC SDUs from one or different logical channels from transport blocks (TB) delivered from the PHY layer 129 on transport channels, scheduling information reporting, error correction through hybrid automatic repeat requests (HARQ), priority handling between UEs by means of dynamic scheduling, priority handling between logical channels of one UE, and logical channel prioritization.

In some embodiments, MAC layer 128 manages multiplexing and demultiplexing of data across a primary component carrier and secondary component carriers when carrier activation is activated. For example, MAC layer 128 distributes data from each logical channel across the primary and secondary component carriers of serving cells identified to the MAC layer 128 (by carrier aggregation aware control logic 107, for example) as related for carrier aggregation purposes. Logical channels, are multiplexed to form transport blocks for each component carrier with each component carrier. When carrier aggregation is activated, a primary component carrier is provided from an antenna 136 to a primary serving cell, and one or more secondary component carriers are provided through one or more other antennas 136 for one or more secondary serving cells, at the same time. A primary serving cell is selected for a UE 102 during cell search by the UE 102. In some embodiments, secondary cell coverage is added and activated or deactivated by MAC layer 128 in response to signaling from RRC layer 125. For example, activation and deactivation of secondary component carriers may be managed through MAC control elements sent from the RRC layer 125 to the MAC layer 128. In some embodiments, deactivation of secondary component carriers by the MAC layer 128 may be time based.

As shown in FIG. 1A, in some embodiments the BBU 120 further implements the carrier aggregation aware control logic 107. The carrier aggregation aware control logic 107 works in conjunction with one or both of the RRC layer 125 and the MAC layer 128 to activate, deactivate, and/or reconfigure the current serving cell relationship configuration. The carrier aggregation aware control logic 107 also dynamically computes carrier aggregation utilization statistics for current primary serving cell and secondary serving cell relationships. In some embodiments, when the carrier aggregation utilization statistics indicate that carrier aggregation is underutilized with the current set of P-cell to S-cell relationships, the carrier aggregation aware control logic 107 may adjust or reconfigure one or more parameters of the MAC layer 128 to implement a different set of UL and DL frequency combinations. In some embodiments, the carrier aggregation aware control logic 107 may review the UE's capabilities in both UL and DL carrier aggregation frequency combinations during initial setup and may also determine if a current primary serving cell is or is not among the UL NRCA combinations supported. The carrier aggregation aware control logic 107 may configure the UE and wait for primary cell measurements of signal parameters, such as signal power, signal-to-interference-and noise (SINR), or other signal measurement and may also determine if the UE is in the coverage area of the primary serving cell in question. If the UE is in the coverage area of the primary serving cell the bandwidth of the current primary serving cell and a proposed primary serving cell are compared by the carrier aggregation aware control logic 107. If the difference between the current primary serving cell and the potential primary cell bandwidths are less than an operator defined threshold, the carrier aggregation aware control logic directs that a handover to the proposed primary serving cell be made.

The carrier aggregation aware control logic may also configure secondary cells during an ongoing session or initial set when DL secondary cells are being configured. The carrier aggregation aware control logic 107 may review the capabilities of the UE in both UL and DL NRCA and may also evaluate if the UL NRCA frequency combinations match or are a subset of the configured DL NRCA frequency combinations. In addition, the carrier aggregation aware control logic 107 may evaluate the UE for new DL secondary cell frequency combinations that are a match or a superset of UL NRCA supported frequency combinations. If a match is found, the carrier aggregation aware control logic 107 may select the highest effective bandwidth of the initial DL NRCA combination with a selected initial DL NRCA combination. If the difference between the current secondary cell and a selected initial DL NRCA combination is less than an operator defined threshold, then the carrier aggregation aware control logic 107 configures a new DL NRCA combination as well as an UL NRCA combination.

Figure 2:
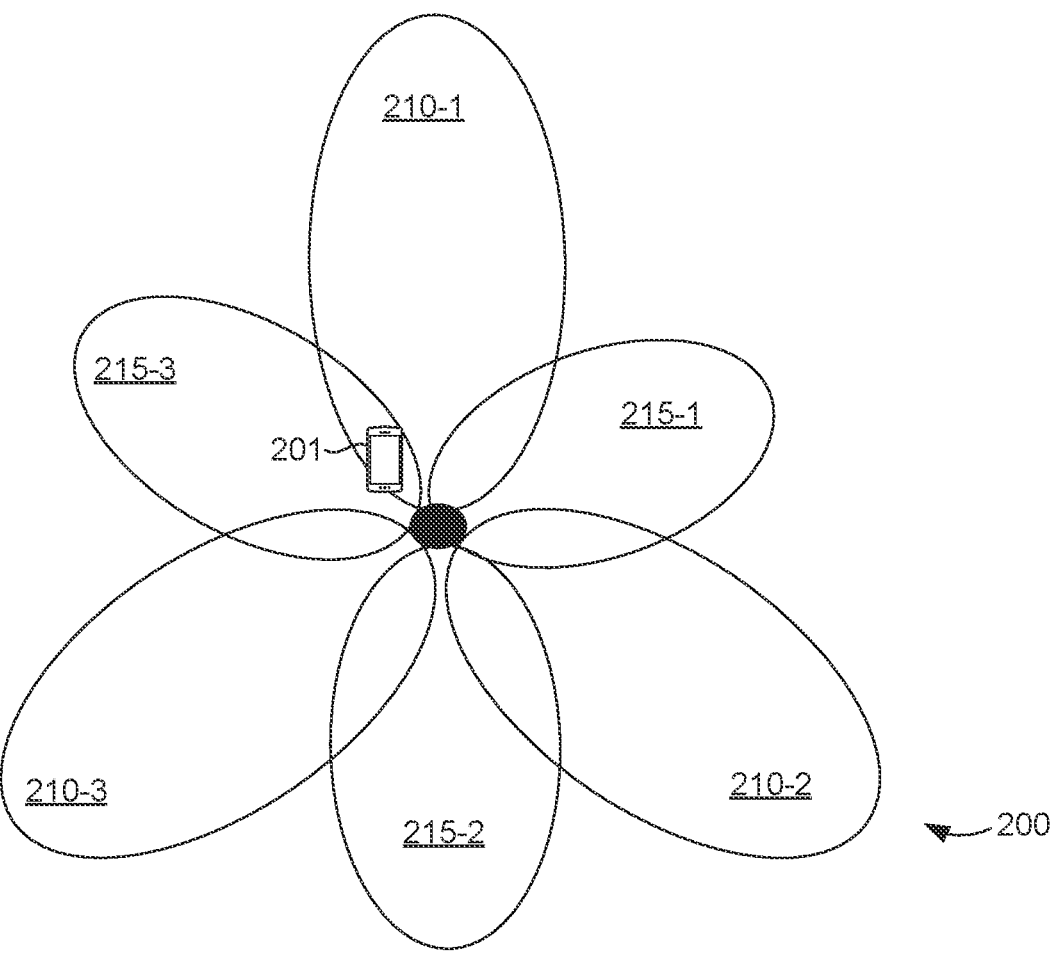
FIG. 2 is diagram illustrating an example of primary serving cell to secondary serving cell relationship reconfiguration according to an embodiment.

With reference to FIG. 2, an example of P-cell to S-cell relationship reconfiguration according to an embodiment is illustrated at 200. In this example, cells 210-1, 210-2 and 210-3 each operate at a first carrier frequency, $f_1$. The first carrier frequency, $f_1$, defines the primary component carrier so $t_h$ at that cells 210-1, 210-2 and 210-3 each function as primary serving cells. Cells 215-1, 215-2 and 215-3 each operate at a secondary carrier frequency, $f_2$. The secondary carrier frequency, $f_2$, defines the secondary component carrier so that cells 215-1, 215-2 and 215-3 each function as secondary serving cells. For the initial P-cell to S-cell relationship in this example, the MAC layer is configured to relate primary serving cell 210-1 with secondary serving cell 215-1, primary serving cell 210-2 with secondary serving cell 215-2, and primary serving cell 210-3 with secondary serving cell 215-3.

UE 201 is located within the geographic area of primary serving cell 210-1 and is configured to use UL and DL carrier aggregation. As shown in FIG. 2, UE 201 is also located within the geographic area of secondary serving cell 215-3, which overlaps with primary serving cell 210-1. UE 201 may be served by either primary serving cell 210-1 or secondary serving cell 215-3 as directed by carrier aggregation aware control logic 107. Primary serving cell 210-1 may utilize various combinations of frequencies and secondary serving cell 215-1 may utilize different combinations of frequencies, with some overlapping of frequency combinations between the primary serving cell 210-1 and the secondary serving cell 215-1.

Figure 3:
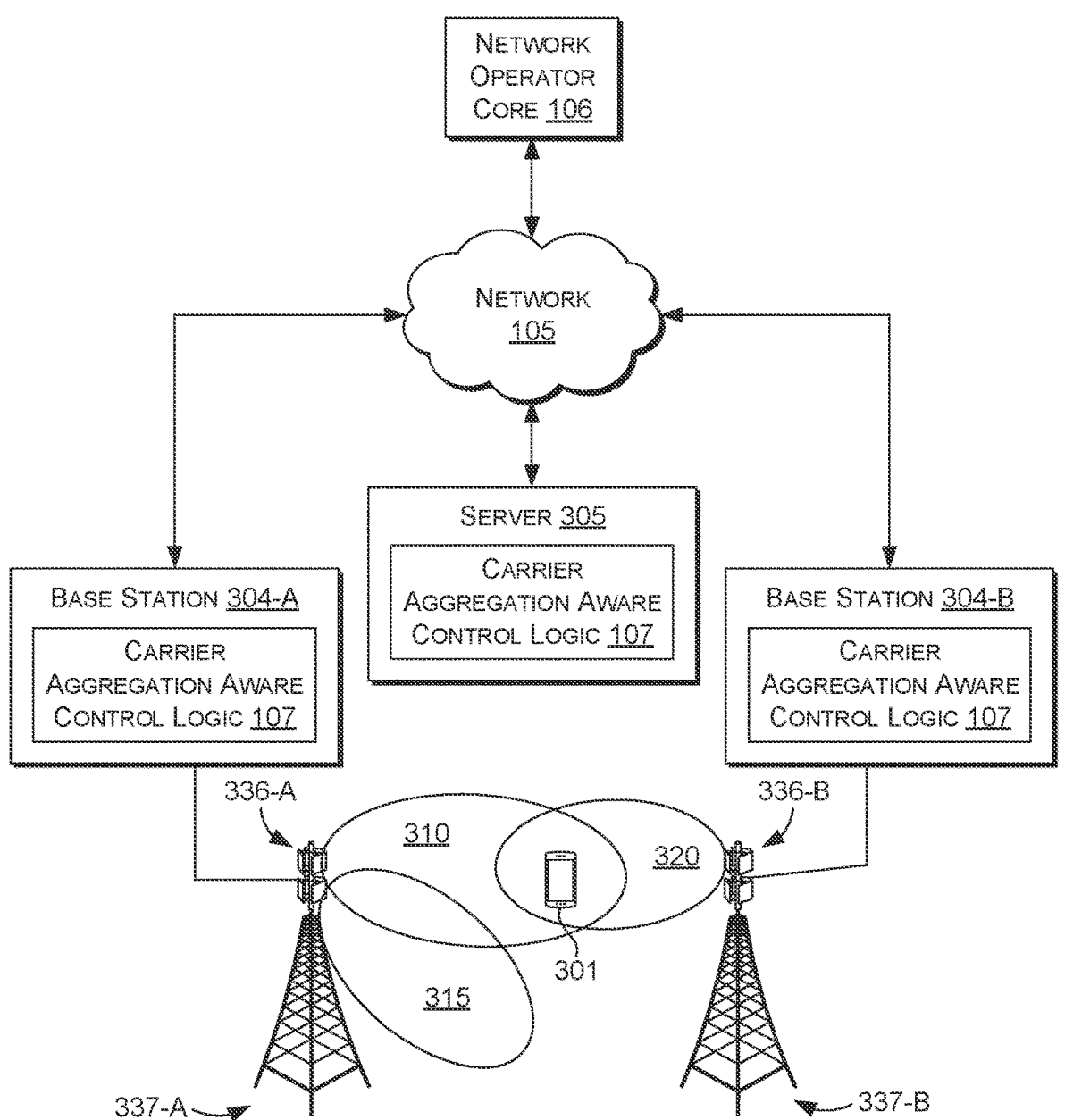
FIG. 3 is a diagram illustrating another example network environment according to an embodiment.

FIG. 3 illustrates an example embodiment of a network environment 300 (such as network environment 100 shown in FIG. 1) comprising a first base station 304-A and a second base station 304-B coupled to the network operator core 106 via network 105. In this example, base station 304-A is coupled to one or more antennas 336-A (which may be mounted to a site tower 337-A, for example). Base station 304-A forms at least one cell 310 that operates at a first carrier frequency, $f_1$, defining a primary component carrier. Cell 310 functions as a primary serving cell to at least one UE 301 within the geographic area of cell 310. Base station 304-A forms at least one other cell 315 that operates at a second carrier frequency, $f_2$. Cell 315 is configured by base station 304-A to relate to cell 310 for carrier aggregation purposes and therefore may function as a secondary serving cell for any UE that are located within the overlapping geographic regions of cell 310 and cell 315. Base station 304-B is coupled to one or more antennas 336-B (which may be mounted to a site tower 337-B, for example) and forms at least one cell 310 that operates at a third carrier frequency, $f_3$ (where the third carrier frequency, $f_3$, may be the same as, or different from, the second carrier frequency, $f_2$). For this embodiment, the carrier aggregation aware control logic 107 may be implemented in the base station 304-A for the primary serving sell 310, in a separate network node or server 305 coupled to the base station 304-A via a network (such as network 105, for example), or implemented in a distributed fashion between base station 304-A and server 305. In this example, the UE 301 is within the coverage area of base station 304-A and communicates with the network operating core 106 over the primary component carrier of primary serving cell 310.

Figure 4:
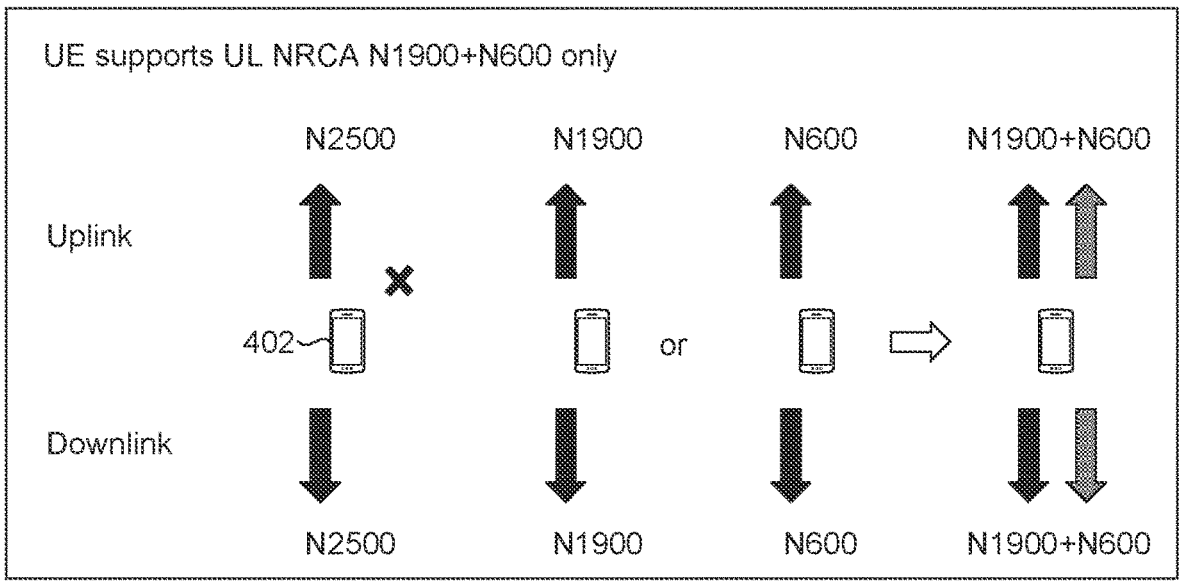
FIG. 4 is diagram illustrating an example of UL NRCA aware primary cell selection, in accordance with some embodiments described herein.

FIG. 4 is a diagram illustrating another example network environment according to an embodiment. As one example, consider a UE 402 supporting an UL NRCA frequency combination of N1900 (N41 in 3GPP naming convention)+ N600 (N71) while also supporting DL NRCA frequency combinations N2500 (N41)+N1900 (N25); N2500 (N41)+ N600 (N71); N2500 (N41)+N2500 (N41); N2500 (N41)+ N1900 (N25)+N600 (N71). If N2500 (N41) is configured to be the highest priority in the network and is used by UEs to camp on when available, then UEs such as UE 402 will go to N2500 (N41) without any consideration of UL NRCA capability and cannot use UL NRCA while camped on N2500 (N41), shown by the X in FIG. 4. Aspects disclosed herein provide for proactively moving UEs to other layers based on UL NRCA support, such as to either N1900 (N25) or N600 (N71) so that when either UL or DL has a throughput buffer requirement in either UL or DL, then DL NRCA and UL NRCA can be activated to provide increased speed and an improved end user experience. If there is a simultaneous UL buffer requirement, the UE cannot perform UL NRCA because the supported UL NRCA combinations are not a subset of UE 502 active DL NRCA combinations. Under these conditions, a gNB may proactively select an appropriate secondary cell to allow for simultaneous UL NRCA. One selection that the gNB could make is to select N1900 as the secondary cell instead of selecting a second N2500, which is illustrated with an X in FIG. 5.

Figure 5:
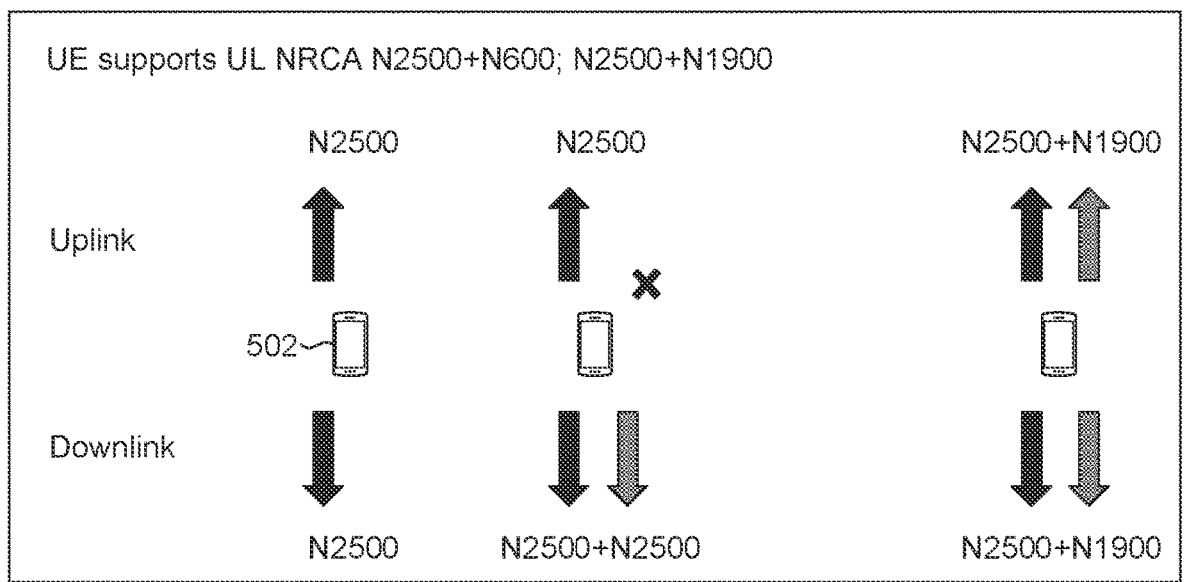
FIG. 5 is a diagram illustrating an example of UL NRCA aware secondary cell selection in a two component carrier scenario, in accordance with some embodiments described herein.

FIG. 5 is diagram illustrating an example of UL NRCA aware primary cell selection in accordance with embodiments described herein. In this example a two component carrier (2CC) scenario is described. A UE 502 supports the following frequency combinations in UL NRCA: N2500 and N600; N2500 and N1900 while also supporting the following frequency combinations in DL: N1900 and N600; N2500 and N1900; N2500 and N600; N2500 and N2500; N2500 and 1900 and N600 in DL NRCA combinations. UE 520 may camp on N2500 as a primary cell due to N2500 having the highest priority. When the network imposes both an UL and a DL buffer requirement, the UE 502 may add another N1900 or N60 as a secondary cell, depending on bandwidth preference, instead of adding a second N2500 even when the second N2500 is a secondary cell candidate with the highest available bandwidth.

Figure 6:
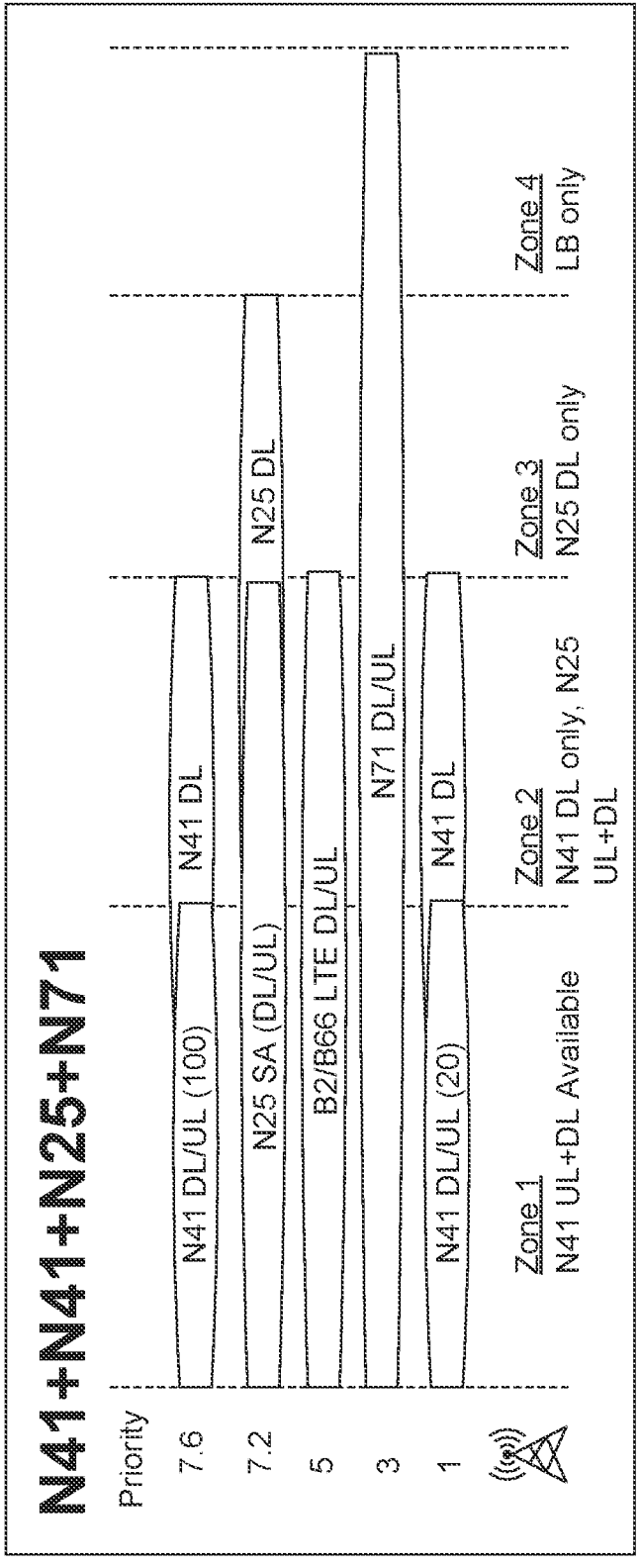
FIG. 6 is a diagram illustrating relative priority of frequencies defined across different layers on a cell site, in accordance with some embodiments described herein.

FIG. 6 is a diagram illustrating relative priority of frequencies defined across different layers on a cell site, in accordance with some embodiments described herein. Three carrier aggregation is depicted in FIG. 6. In the diagram of FIG. 6 the highest priority is shown as 7.6 with N41 available in both UL and DL in zone 1. Zone 1 is the zone closest to the gNB serving a UE. 100 MHZ is the bandwidth available for N41 in zone 1. For zone 2 and highest priority 7.6 the frequency band N41 is available for DL. The highest priority 7.6 is not available in zones 3 and 4, located farthest from the gNB.

The second priority is 7.2 with standalone capability in the N25 frequency band for DL and UL in both zones 1 and 2. In zone 3 there is N25 DL for 7.2 priority with no availability in zone 4. The third priority is 5 for LTE with frequency band B2/B66 available for both UL and DL in both zone 1 and zone 2 and no availability in zones 3 and 4. The fourth priority is 3 with frequency band N71 available in both UL and DL in zones 1, 2, 3, and 4. The fifth priority is 1 with frequency band N41 available for UL and DL at 20 MHZ in zone 1. N41 is available only in DL in zone 2, with no availability in zones 3 and 4. Generally, the higher frequency spectrum is TDD. UEs are aware of the priorities and may select the highest priority available for the zone the UE is currently located in. The network may ask a UE what layers or priorities the device sees, with the reply giving the network an idea of where the device is located relative to gNBs in the network.

FIG. 7 is flow chart illustrating a method for dynamically managing carrier aggregation configuration according to an embodiment. The method 700 begins at 702 with receiving, at a base station, at least one first UL message from at least one UE. The first UL message contains at least one UL and DL carrier aggregation frequency set supported by the at least one UE. The method then continues at 704 with determining by the base station, if a current serving primary cell frequency of the at least one UE is not included in a set of UL NRCA frequency combinations supported by the base station. At 706 if the serving primary cell frequency is not included in the set of UL NRCA frequency combinations supported by the base station, then the method continues with comparing a bandwidth of the current serving primary cell with a bandwidth of a candidate primary cell occurs. Then, at 708, based on the comparing, if a difference in bandwidth between the current serving primary cell is less than a predetermined bandwidth threshold, assigning the at least one UE to the candidate primary cell from the current serving primary cell occurs.

Figure 8:
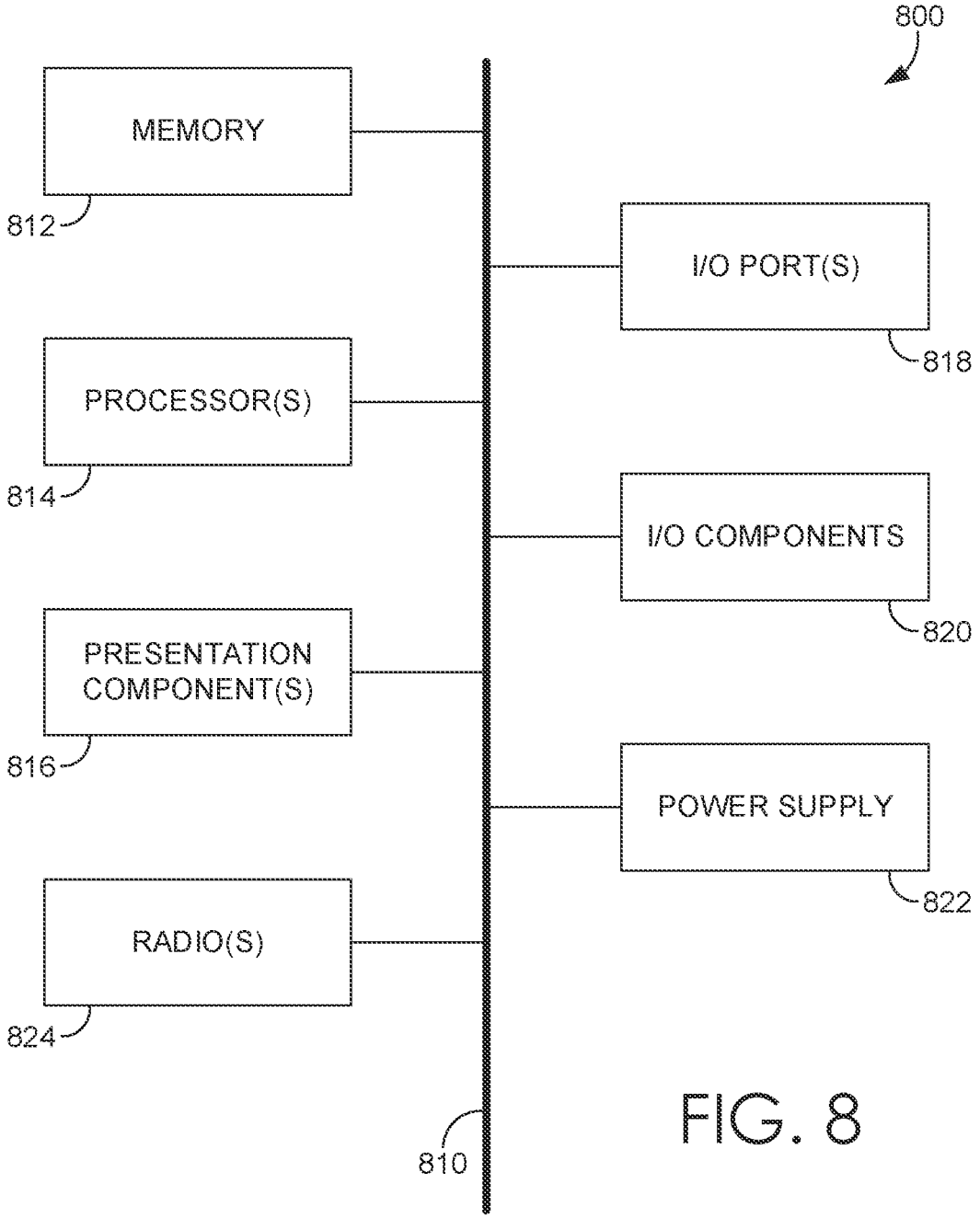
FIG. 8 is a diagram illustrating an example computing environment according to an embodiment.

Referring to FIG. 8, a diagram is depicted of an exemplary computing environment suitable for use in implementations of the present disclosure. In particular, the exemplary computer environment is shown and designated generally as computing device 800. Computing device 800 is but one example of a suitable computing environment and is not intended to suggest any limitation as to the scope of use or functionality of the embodiments described herein. Neither should computing device 800 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output (I/O) ports 818, I/O components 820, power supply 822, and radio 824. Bus 810 represents what may be one or more busses (such as an address bus, data bus, or combination thereof). The devices of FIG. 8 are shown with lines for the sake of clarity. However, it should be understood that the functions performed by one or more components of the computing device 800 may be combined or distributed amongst the various components. For example, a presentation component such as a display device may be one of I/O components 820. Also, processors, such as one or more processors 814, have memory. The present disclosure hereof recognizes that such is the nature of the art, and reiterates that FIG. 8 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device." In some embodiments, the carrier aggregation aware control logic as described in any of the examples of this disclosure may be implemented at least in part by code executed by the one or more processors(s) 814 and in some embodiments. In some embodiments, the one or more processors(s) 814 correspond to the one or more controllers 121 that execute the various functions of the BBU 120.

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. Memory 812 may be removable, nonremovable, or a combination thereof. Exemplary memory includes solid-state memory, hard drives, optical-disc drives, etc. Computing device 800 includes one or more processors 814 that read data from various entities such as bus 810, memory 812 or I/O components 820. One or more presentation components 816 may present data indications to a person or other device. Exemplary one or more presentation components 816 include a display device, speaker, printing component, vibrating component, etc. I/O ports 818 allow computing device 800 to be logically coupled to other devices including I/O components 820, some of which may be built in computing device 800. Illustrative I/O components 820 include a microphone, joystick, game pad, satellite dish, scanner, printer, wireless device, etc.

Radio(s) 824 represents a radio that facilitates communication with a wireless telecommunications network. Illustrative wireless telecommunications technologies include CDMA, GPRS, TDMA, GSM, and the like. Radio 824 might additionally or alternatively facilitate other types of wireless communications including Wi-Fi, WiMAX, LTE, or other VoIP communications. As can be appreciated, in various embodiments, radio(s) 824 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

In various alternative embodiments, system and/or device elements, method steps, or example implementations described throughout this disclosure (such as the base station, baseband unit (BBU), radio unit (RU), scheduler, carrier aggregation aware control logic, or any of the subparts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as base station, radio access network, network operator core, user equipment (UE), baseband unit (BBU), radio unit (RU), scheduler, CA-RCL function, network node, server, and other terms derived from these words refer to the names of elements that would be understood by one skilled in the art of wireless telecommunications and related industries as conveying structural elements, and are not used herein as nonce words or nonce terms for the purpose of invoking 35 U.S.C. 112(f). The terms "function", "unit", "node" and "module" may also be used to describe computer processing components and/or one or more computer executable services being executed on one or more computer processing components.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A method of uplink new radio carrier aggregation (UL NRCA) aware cell selection in a network, the method comprising:

receiving, at a base station, at least one first uplink message from at least one user equipment (UE), wherein the at least one first uplink message contains at least one UL and downlink (DL) carrier aggregation frequency set supported by the at least one UE;

determining, by the base station, if a current serving primary cell frequency of the at least one UE is not included in a set of UL NRCA frequency combinations supported by the base station;

based on the determining, if the serving primary cell is not included in the set of UL NRCA frequency combinations supported by the base station, comparing a bandwidth of the current serving primary cell with a bandwidth of a candidate primary cell; and based on the comparing, if a difference in bandwidth between the current serving primary cell is less than a predetermined bandwidth threshold, assigning the at least one UE to the candidate primary cell from the current serving primary cell.

2. The method of claim 1, wherein if the current serving primary cell frequency of the at least one UE is not included in the set of UL NRCA frequency combinations supported by the base station then the base station awaits primary cell measurements.

3. The method of claim 2, wherein the primary cell measurements include at least one of: a bandwidth of the current serving primary cell, a signal strength measurement, and a signal to interference and noise (SINR) measurement.

4. The method of claim 1, wherein the candidate primary cell is used for UL NRCA and DL NRCA.

5. The method of claim 1, wherein the predefined bandwidth threshold is a network operator defined threshold.

6. The method of claim 1, wherein the changing from the current serving primary cell to the candidate primary cell is executed during a handover of the at least one UE.

7. The method of claim 1, further comprising determining DL secondary cells.

8. The method of claim 7, wherein determining downlink secondary cells comprises:

determining UL NRCA and initial DL NRCA frequency combinations; and determining if an UL NRCA frequency combination is a subset of configured DL NRCA frequency combinations.

9. The method of claim 8, based on the determining, evaluating DL secondary cell frequency combinations if not an already configured DL NRCA frequency combination.

10. The method of claim 9, further comprising, based on the evaluating, comparing an effective bandwidth of the initial DL NRCA frequency combination and a candidate DL NRCA frequency combination.

11. The method of claim 10, wherein if the effective bandwidth difference is less than a predefined threshold, configuring the candidate DL NRCA frequency combination and an UL NRCA frequency combination.

12. A non-transitory computer storage media storing computer-useable instructions that, when used by one or more processors, cause the processors to:

receive, at a base station, at least one first uplink message from at least one user equipment (UE), wherein the at least one first uplink message contains at least one uplink (UL) and downlink (DL) new radio carrier aggregation (NRCA) frequency set supported by the at least one UE;

determine, at the base station, if a current serving primary cell frequency of the at least one UE is included in a set of UL NRCA frequency combinations supported by the base station;

based on the determination, if the serving primary cell is not included in the set of UL NRCA frequency combinations supported by the base station, compare a bandwidth of the current serving primary cell with a bandwidth of a candidate primary cell; and based on the comparison, if a difference in bandwidth between the current serving primary cell is less than a predetermined bandwidth threshold, instructing the UE to change from the current serving primary cell to the candidate primary cell.

13. The non-transitory computer storage media of claim 12, wherein if the current serving primary cell frequency of the at least one UE is not included in the set of UL NRCA frequency combinations, instruct the UE to send primary cell measurements to the base station.

14. The non-transitory computer storage media of claim 12, wherein the candidate primary cell is used for UL NRCA and DL NRCA.

15. The non-transitory computer storage media of claim 12, further comprising determine DL secondary cells.

16. The non-transitory computer storage media of claim 15, wherein determine DL secondary cells comprises:

determine UL NRCA and initial DL NRCA frequency combinations; and determine if an UL NRCA frequency combination is a subset of configured DL NRCA frequency combinations.

17. The non-transitory computer storage media of claim 16, further comprising, evaluate DL secondary cell frequency combinations if not already configured DL NRCA frequency combinations;

compare an effective bandwidth of an initial DL NRCA frequency combination and a candidate DL frequency combination; and configure the candidate DL NRCA frequency combination and an UL NRCA frequency combination if the effective bandwidth is less than a predetermined threshold.

* * * * *